United States Patent
Kim (10) Patent No.: US 9,395,862 B2
(45) Date of Patent: Jul. 19, 2016

(54) TOUCH PEN, ELECTRONIC DEVICE FOR RECOGNIZING THE TOUCH PEN, AND METHOD OF OPERATING THE ELECTRONIC DEVICE

(71) Applicant: Samsung Electronics Co., Ltd, Gyeonggi-do (KR)

(72) Inventor: Jin Kim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 104 days.

(21) Appl. No.: 14/175,775

(22) Filed: Feb. 7, 2014

(65) Prior Publication Data

US 2014/0218338 A1 Aug. 7, 2014

(30) Foreign Application Priority Data

Feb. 7, 2013 (KR) .......................... 10-2013-0013857

(51) Int. Cl.
  *G06F 3/033* (2013.01)
  *G06F 3/046* (2006.01)
  *G06F 3/0354* (2013.01)
  *G06F 3/041* (2006.01)

(52) U.S. Cl.
  CPC ............ *G06F 3/046* (2013.01); *G06F 3/03545* (2013.01); *G06F 3/041* (2013.01)

(58) Field of Classification Search
  CPC ......... G06F 3/041; G06F 3/033; G06F 3/037; G06K 11/06; G08C 21/00; G09G 1/00; G09G 3/22

USPC ................................................... 345/156, 179
See application file for complete search history.

(56) References Cited

U.S. PATENT DOCUMENTS

| | | | |
|---|---|---|---|
| 4,672,154 A | 6/1987 | Rodgers et al. | |
| 5,576,502 A | 11/1996 | Fukushima et al. | |
| 5,672,852 A * | 9/1997 | Fukuzaki et al. | 178/18.07 |
| 6,727,439 B2 | 4/2004 | Chao et al. | |
| 6,894,683 B2 | 5/2005 | Clapper et al. | |

(Continued)

FOREIGN PATENT DOCUMENTS

| | | |
|---|---|---|
| CA | 2812398 | 10/2013 |
| CN | 201812254 | 4/2011 |

(Continued)

OTHER PUBLICATIONS

International Search Report dated Apr. 30, 2014 in connection with International Patent Application No. PCT/KR2014/000928, 4 pages.

(Continued)

*Primary Examiner* — Pegeman Karimi (57) ABSTRACT

An electronic device includes an electromagnetic inductive type touch pen and a pen touch panel for recognizing the touch pen. The touch pen includes a hollow housing having a certain length, a coil body installed in the housing and including a coil wound a plurality of times and having a certain length, a magnetic body installed to be separated from the coil body with a certain interval and inducing the coil body to generate a certain resonance frequency, and a button unit installed to expose a part thereof to the outside of the housing and to be flowable and inducing a variance in the resonance frequency of the coil body by controlling an electric length of the coil wound around the coil body according to an operation of a user.

17 Claims, 12 Drawing Sheets

(56) References Cited

U.S. PATENT DOCUMENTS

| | | | |
|---|---|---|---|
| 7,834,863 B2 | 11/2010 | Lee | |
| 8,982,044 B2* | 3/2015 | Katsurahira | 345/156 |
| 2003/0141119 A1 | 7/2003 | Chao et al. | |
| 2003/0146906 A1 | 8/2003 | Lin | |
| 2004/0008189 A1 | 1/2004 | Clapper et al. | |
| 2004/0125089 A1* | 7/2004 | Chao et al. | 345/179 |
| 2006/0055686 A1 | 3/2006 | Lee | |
| 2008/0150917 A1 | 6/2008 | Libbey et al. | |
| 2009/0295759 A1 | 12/2009 | Thorsell | |
| 2010/0148759 A1* | 6/2010 | Lagerberg | G01R 1/06788 324/149 |
| 2011/0115753 A1 | 5/2011 | Katsurahira | |
| 2011/0297458 A1* | 12/2011 | Mao et al. | 178/19.04 |
| 2012/0293425 A1* | 11/2012 | Lee et al. | 345/173 |
| 2013/0271431 A1* | 10/2013 | Besperstov | 345/179 |
| 2014/0218343 A1* | 8/2014 | Hicks et al. | 345/179 |

FOREIGN PATENT DOCUMENTS

| | | |
|---|---|---|
| CN | 102298454 | 12/2011 |
| CN | 102789324 | 11/2012 |
| CN | 202711187 | 1/2013 |
| EP | 1 331 547 A1 | 7/2003 |
| EP | 1 635 421 A1 | 3/2006 |
| JP | H 02162410 A | 6/1990 |
| JP | H 05233126 A | 9/1993 |
| JP | H 06102989 A | 4/1994 |
| JP | H 08335132 A | 12/1996 |
| JP | 2010-262643 A | 11/2010 |
| WO | WO 02/34549 A1 | 5/2002 |

OTHER PUBLICATIONS

Written Opinion of the International Searching Authority dated Apr. 30, 2014 in connection with International Patent Application No. PCT/KR2014/000928, 6 pages.
Notice of Preliminary Rejection dated Oct. 21, 2014 in connection with Japanese Patent Application No. 2013-250674; 11 pages.
Patent Examination Report No. 1 dated Feb. 7, 2015 in connection with Australian Patent Application No. 2014200307; 3 pages.
Office Action dated Apr. 9, 2015 in connection with Taiwan Patent Application No. 103102847; 5 pages.
Notification of Reconsideration Report dated Nov. 18, 2015 in connection with Japanese Patent Application No. 2013-250674; 4 pages.
Notice of Acceptance dated Nov. 25, 2015 in connection with Australian Patent Application No. 2014-200307; 2 pages.
Chinese Office Action issued for CN 201310637024.3 dated Jun. 1, 2016, 18 pgs.
Canadian Office Action issued for CA 2,841,503 dated May 31, 2016, 5 pgs.

* cited by examiner

TOUCH PEN, ELECTRONIC DEVICE FOR RECOGNIZING THE TOUCH PEN, AND METHOD OF OPERATING THE ELECTRONIC DEVICE

PRIORITY

The present application is related to and claims priority under 35 U.S.C. §119 to an application filed in the Korean Intellectual Property Office on Feb. 7, 2013 and assigned Serial No. 10-2013-0013857, the contents of which are incorporated herein by reference.

TECHNICAL FIELD

The present disclosure relates generally to a touch pen, an electronic device for using the touch pen, and a method of operating the electronic device.

BACKGROUND

Generally, electronic devices include input units for inputting data and output units for outputting data. Key button units can be generally classified as input units, and display units including liquid crystal display (LCD) modules can be generally classified as output units.

Recently, touch screen devices have been released, which can input or output data at the same location to notably reduce volumes of electronic devices and to diversify functions thereof. In the case of such touch screen devices, a transparent panel is disposed on a top of an LCD module, thereby inputting or outputting at the same time. Touch panels can be classified into various types of touch panel such as resistive touch panels, electrostatic capacitive touch panels, ultrasonic touch panels, infrared (IR) sensitive touch panels, electromagnetic touch panels and the like.

Generally, in the case of touch screen devices, data is inputted by using a finger of a user. However, recently, multiple touch screen devices have been released, in which an input device having a pen shape, generally designated as a touch pen, is provided as an auxiliary input element and data is selectively inputted by using the touch pen. Also, individual sensing elements are provided in addition to touch panels of touch screen devices in such a way that data input using a pen input device and data input using a touch panel are separately used.

As described above, electromagnetic induction methods are generally used when using touch pens. That is, electronic devices respectively include a pen touch panel that is generally designated as a digitizer, in which a plurality of coils are disposed to be orthogonal to one another, as an additional sensing element separately from a touch panel, and touch pens respectively include a resonance circuit. Accordingly, an alternating current (AC) signal is applied to coils of a pen touch panel to be operated, when a touch pen accesses or is place in proximity to a touch screen of such electronic device, a coil of the pen touch panel, adjacent to the touch pen forms a magnetic field, a resonance frequency occurs in the touch pen while being resonant with the magnetic field, and the generated resonance frequency is sensed by a control unit of the electronic device, thereby recognizing a corresponding touch position.

SUMMARY

To address the above-discussed deficiencies of the related art, it is a primary object to provide a touch pen, an electronic device for recognizing the touch pen, and a method of operating the electronic device. Another object of the present disclosure is to provide a touch pen, an electronic device for recognizing the touch pen, and a method of operating the electronic device, in which sequential changes in a thickness of a line are freely performed by simple operations while using the touch pen. Another object of the present disclosure is to provide a touch pen, an electronic device for recognizing the touch pen, and a method of operating the electronic device, which are for easily changing a thickness of a line by using the touch pen with no damage to a display screen of the electronic device.

Another object of the present disclosure is to provide a touch pen, an electronic device for recognizing the touch pen, and a method of operating the electronic device, in which touch operations in accordance with intentions of a user can be accurately performed, thereby increasing reliability of products.

According to the present disclosure, an electronic device includes an electromagnetic inductive type touch pen and a pen touch panel for recognizing the touch pen. The touch pen includes a hollow housing having a certain length, a coil body installed in the housing and including a coil wound a plurality of times and having a certain length, a magnetic body installed to be separated from the coil body with a certain interval and inducing the coil body to generate a certain resonance frequency, and a button unit installed to expose a part thereof to the outside of the housing and to be flowable and inducing a variance in the resonance frequency of the coil body by controlling an electric length of the coil wound around the coil body according to an operation of a user. The button unit can include a sliding key button partially exposed to the outside of the housing and sliding in a longitudinal direction of the housing according to an operation of the user and a fluid terminal installed protruding from the sliding key button toward the coil body to be in constant contact with a wound part of the coil. One end of the fluid terminal can change the electric length of the coil by changing a contact part with the coil wound around the coil body according to a sliding operation of the sliding key button. Another end of the fluid terminal can be constantly, electrically connected to an end of the coil regardless of a flow of the sliding key button. Also, a capacitor can be further disposed between the contact part between the fluid terminal and the coil and the end of the coil.

The sliding key button can include an operation part exposed to the outside of the housing, a guide rib extended from the operation part to be disposed in the housing and preventing a separation of the sliding key button, a metallic fluid terminal installed to be partially exposed from the inside of the operation part and controlled not to be separated from the operation part, and a spring constantly pressing the fluid terminal outward in the operation part. The electronic device can further include at least one spring installed in the housing to allow the sliding key button to restore an original position after operation.

According to the present disclosure, a method of operating an electronic device including a touch pen including a button unit installed to be exposed to the outside and to be operated for a variance in frequency includes checking, when an input is performed by the touch pen, a frequency emitted from the touch pen, comparing the checked frequency with an output data table, and outputting data corresponding to the frequency. The method can further include, after the comparing with the output data table, displaying a preview window corresponding to the data. The outputted data can be a line having a certain thickness or other continuous, detailed, and changeable data outputted by a transfer of the touch pen. For example, data outputted in the preview window can be displayed in a line thickness corresponding to a frequency currently inputted.

In the checking the input by the touch pen, an input event can be sensed when the touch pen enters within a certain sensing distance before contact between the touch pen and a display surface of the electronic device.

After the outputting the data, the method can further include checking whether a frequency inputted by the touch pen is changed or not and outputting, when the frequency is changed, data changed corresponding to the changed frequency.

After the outputting the data, when an input of the touch pen is not recognized for a certain amount of time, the outputted data can be changed into a default value.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication device. Embodiments of the present disclosure will be described herein below with reference to the accompanying drawings. In the following description, detailed descriptions of well-known functions or constructions will be omitted since they would obscure the disclosure in unnecessary detail. Also, the terms used herein are defined according to the functions of the present disclosure. Thus, the terms can vary depending on user's or operator's intentions or practices. Therefore, the terms used herein must be understood based on the descriptions made herein.

While describing the embodiments, a mobile communication terminal including a multiple touch screen is described and illustrated as an electronic device. However, the present disclosure is not limited thereto. For example, the electronic device can include various devices including a multiple touch screen, such as personal digital assistants (PDA), laptop computers, smart phones, netbooks, mobile internet devices (MID), ultra mobile personal computers (PC), table PCs, navigations, MP3s, portable terminals, and the like.

Additionally, in the present disclosure, although a multiple touch panel provided together with a touch panel and a pen touch panel is illustrated and described, it is available for electronic devices which can have a pen touch panel usable with a touch pen.

In addition, in the present disclosure, it is described that a thickness of a line is controlled by inputting data using a touch pen. However, the present disclosure is not limited thereto. For example, data inputted by the touch pen can be applied to control the output of various types of data that is detailed and can be sequentially outputted on the electronic device.

Figure 1:
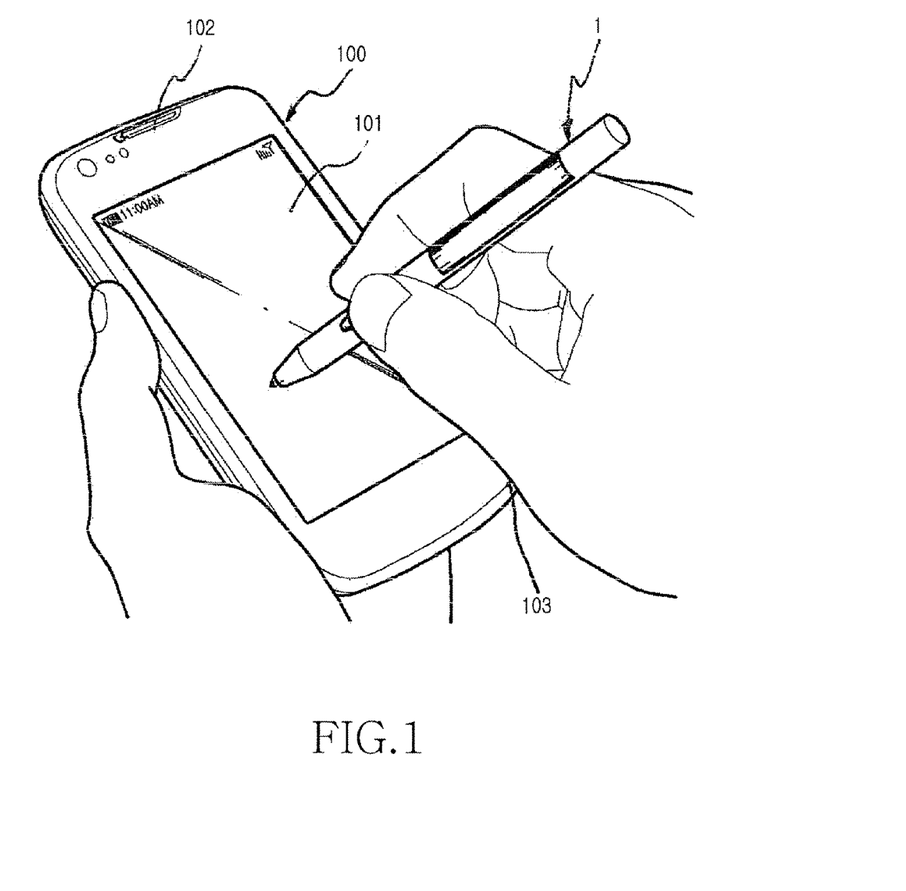
FIG. 1 is a perspective view illustrating a state of operating a touch screen of an electronic device by using a touch pen according to certain embodiments of the present disclosure.

FIG. 1 is a perspective view illustrating a state of operating a touch screen unit 101 of an electronic device 100 by using a touch pen 1 according to certain embodiments of the present disclosure. Referring to FIG. 1, the electronic device 100 includes the touch screen unit 101, an ear piece 102 disposed on a top thereof, and a microphone 103 disposed therebelow.

The touch screen unit 101 of the electronic device 100 is a multiple touch screen and includes a touch panel 182 (refer to FIG. 2) for recognizing a touch of a human body of a user, that is, a finger or a palm and a pen touch panel 183 (refer to FIG. 2) for recognizing an input performed by the touch pen 1.

In certain embodiments, the touch panel 182 can be an electrostatic capacitive or resistive touch panel for recognizing an input of data while a finger of the user is in direct contact with a surface of the touch screen unit 101.

In certain embodiments, the pen touch panel 183 can be an electromagnetic induction touch panel capable of recognizing proximity of the touch pen within a certain distance before the touch pen 1 is in contact therewith.

In the present embodiment, an electromagnetic capacitive touch panel is used as the touch panel for recognizing the human body of the user, that is, the finger or palm of the user and an electromagnetic induction digitizer flat panel is used as the pen touch panel.

According to the present embodiment, in the case of a pen touch panel mode, when the touch pen is close to the touch screen or is in contact therewith, the electronic device can receive an input signal of the touch pen and can output corresponding data. The data can be changeable by a sliding button unit installed to be operable on a handle part of the touch pen. In certain embodiments, it is possible to control data minutely in detail by sliding a sliding key button of the sliding button unit forward and backward. For example, it can be applied when sequentially controlling a thickness of a line in detail or minutely controlling a volume of audio presently outputted.

Figure 2:
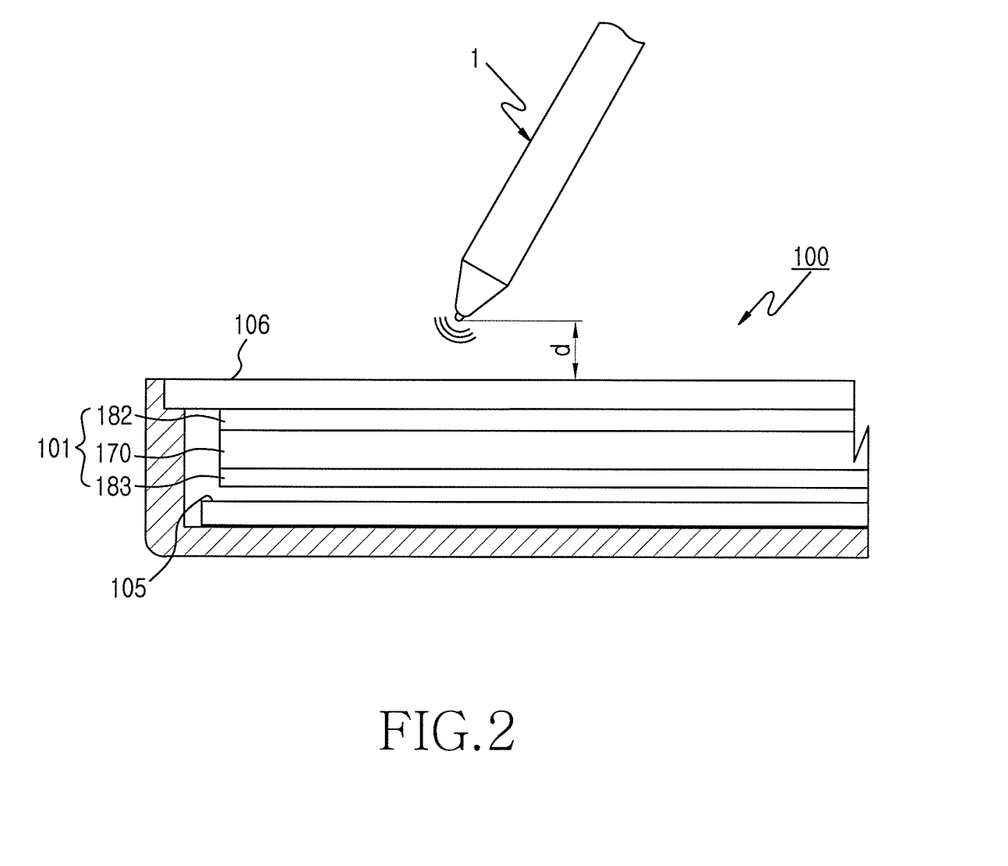
FIG. 2 is a cross-sectional view illustrating a state of applying the touch pen of FIG. 1 to the electronic device.

FIG. 2 is a cross-sectional view illustrating a state of applying the touch pen 1 to the electronic device 100 according to certain embodiments of the present disclosure.

Referring to FIG. 2, the electronic device 100 includes the touch screen unit 101 that is a multiple touch screen formed by sequentially mounting the pen touch panel 183, a display unit 170 that is a display part, and the touch panel 182 in an inner mounting area of a certain case frame. The transparent touch panel 182 can be mounted on a bottom of a window 106 of the portable terminal (described also as an electronic device or an portable electronic device) 100 (by performing deposition, and the display unit 170 such as a liquid crystal display (LCD) module is mounted therebelow.

Although not shown in the drawings, the pen touch panel 183 can include a sensor substrate, which is a printed circuit board (PCB), on which a plurality of X-axis coil arrays and a plurality of Y-axis arrays are disposed to be orthogonal to one another, a shield plate installed on a bottom of the sensor substrate to block external electromagnetic waves, and a connector electrically connected to the substrate 105 of the electronic device 100. Also, since including a lightproof coil, the pen touch panel 183 can be disposed below an additional touch panel formed of a transparent material and the display unit 170. However, the present disclosure is not limited thereto and the touch panel 182, the display unit 170, and the pen touch panel 183 can be differently arranged. In addition, the pen touch panel 183 can be disposed below the substrate 105.

According to the present embodiment, when the touch pen 1 accesses the window 106 of the portable terminal 100 within a certain distance d, the pen touch panel 183 can sense the access of the touch pen 1. In this case, the electronic device 100 can sense that the pen touch panel 183 is being used and can allow a function of the touch panel 183 for recognizing a finger of the user to be released. Accordingly, when the touch pen 1 accesses within a sensing distance of the electronic device 100, data according to a corresponding application mode being currently performed by the electronic device 100 can be outputted (displayed). For example, when the corresponding application mode is a line-drawing mode, the electronic device 100 can sense a transfer of the touch pen 1 and can output a line on the display unit 170 of the electronic device 100 as a transfer distance thereof.

In this case, the electronic device 100 can allow the user to minutely and continuously control a thickness of a line by operating a sliding button unit 70 of the touch pen 1. In this case, a resonance frequency of the touch pen variable with the operation of the user with respect to the sliding button unit 70 can be sensed by the electronic device 100, a table showing line thicknesses according to frequencies stored in a data storage unit 117 (refer to FIG. 9) of the electronic device 100 can be checked, and a corresponding line thickness according to an input frequency can be outputted.

Figure 3:
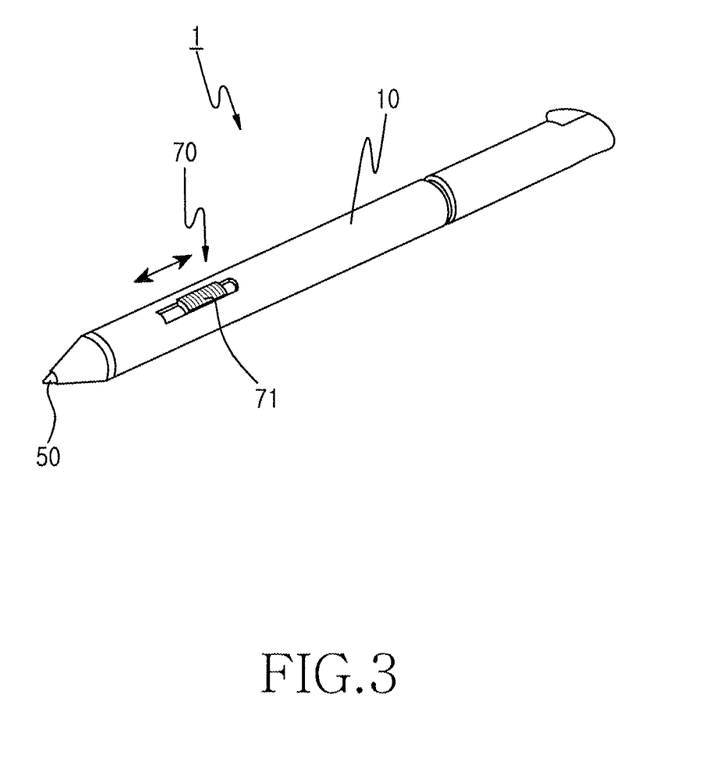
FIG. 3 is a perspective view illustrating a configuration of the touch pen of FIG. 1.
Figure 4:
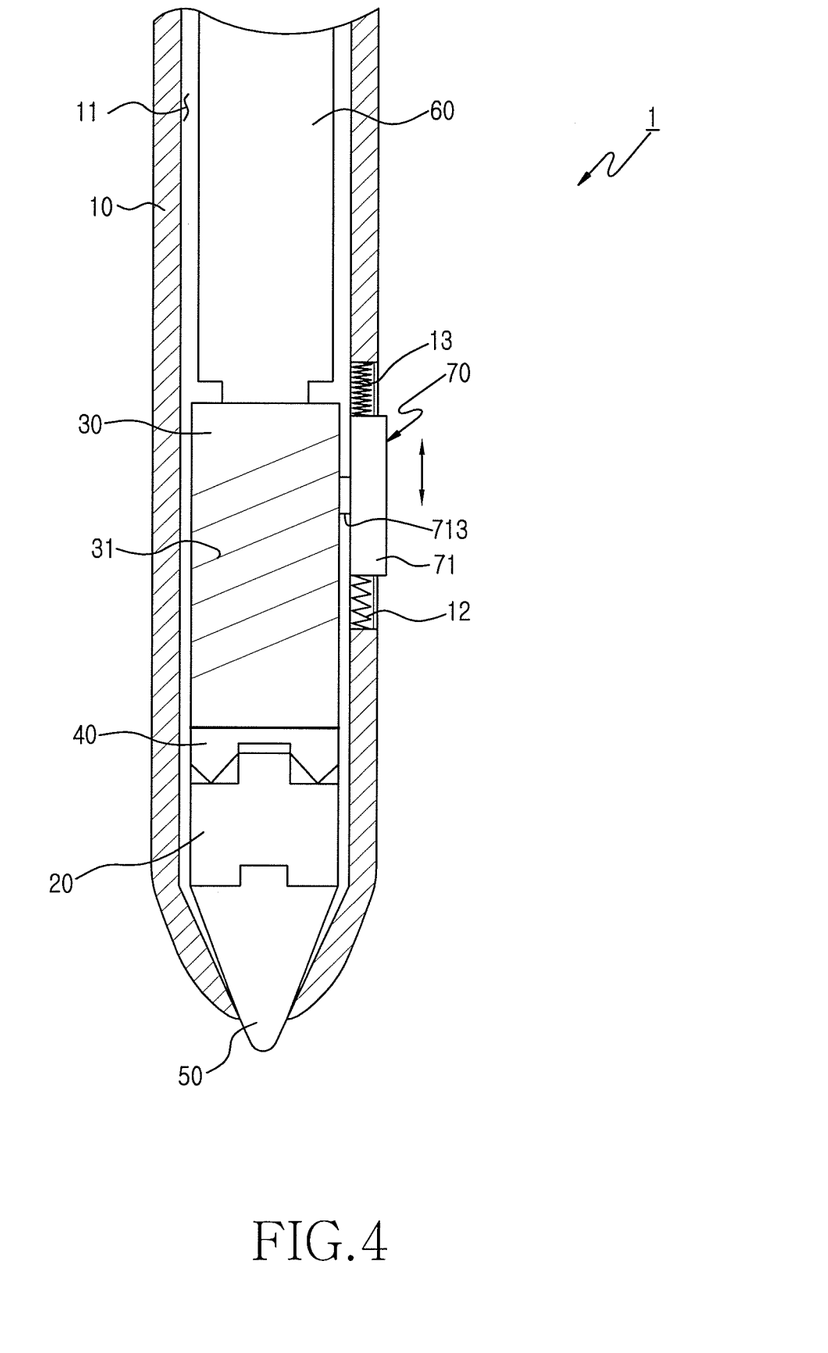
FIG. 4 is a cross-sectional view illustrating the touch pen of FIG. 1.
Figure 5A:
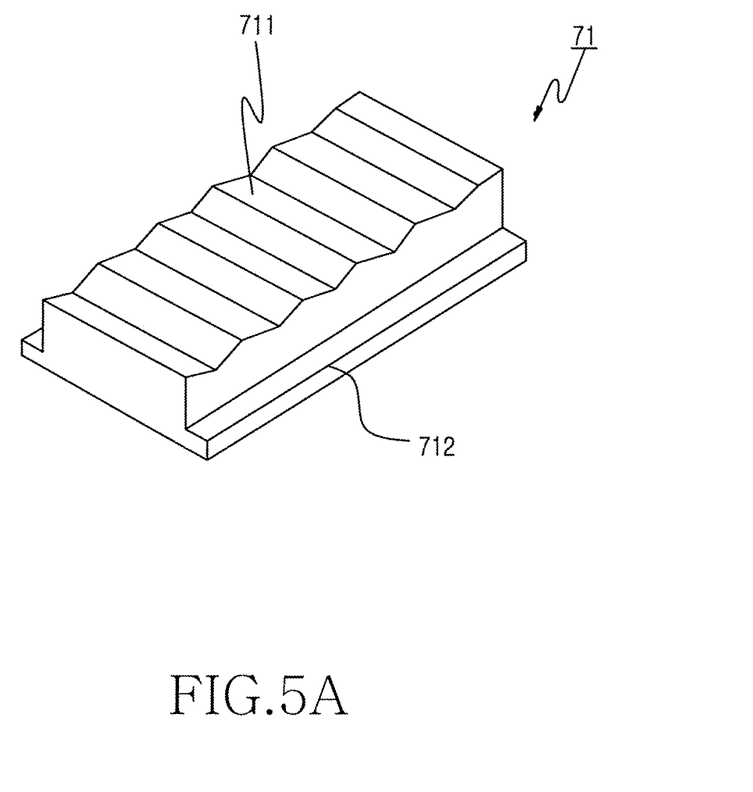
FIGS. 5A to 5C are perspective views and a cross-sectional view illustrating a sliding key button of a sliding button unit applied to the touch pen of FIG. 1.
Figure 5B:
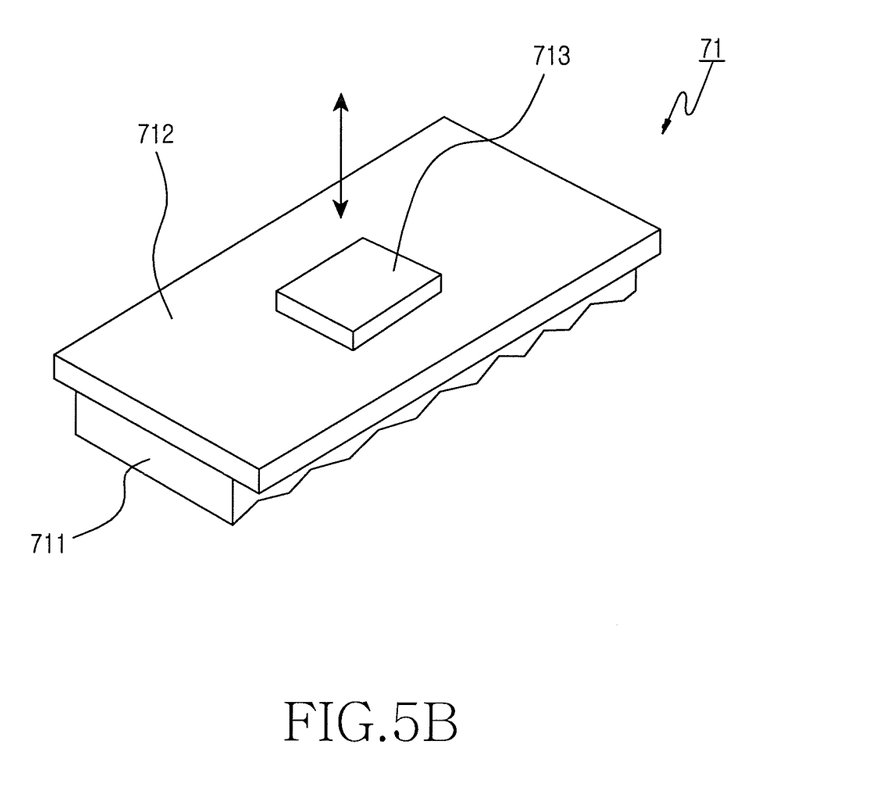
Figure 5C:
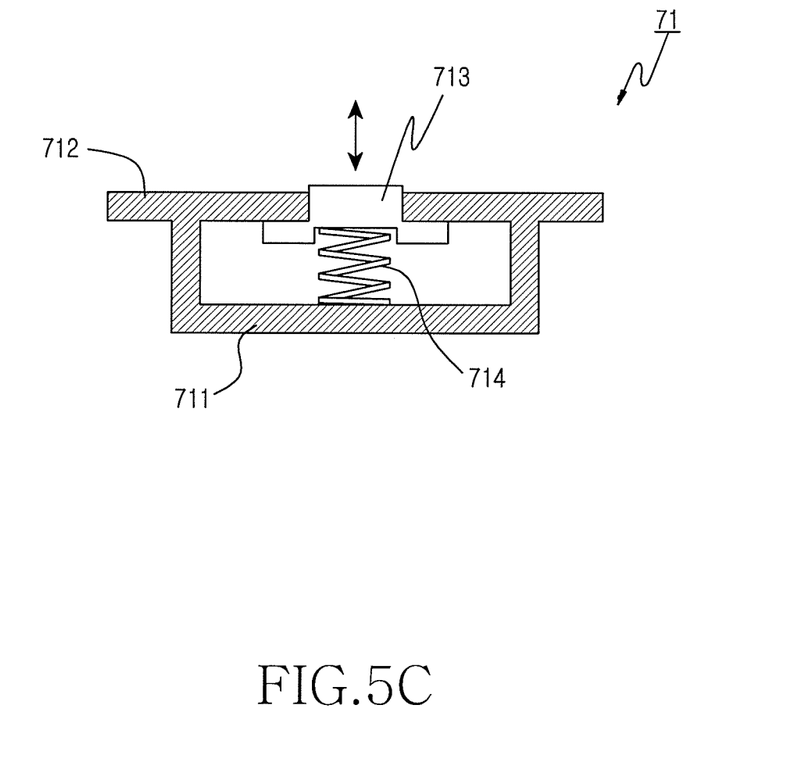

FIG. 3 is a perspective view illustrating a configuration of the touch pen 1, FIG. 4 is a cross-sectional view illustrating the touch pen 1, and FIGS. 5A to 5C are perspective views and a cross-sectional view illustrating a sliding key button 71 of the sliding button unit 70 applied to the touch pen 1.

Referring to FIG. 3, in the case of the touch pen 1, a tip 50 is protruded from one end of a hollow housing 10 having a certain length to access or to be in contact with the touch screen of the electronic device 100. The sliding button unit 70 is installed to be exposed on an outer surface of the housing 10 of the touch pen 1. The sliding button unit 70 can be installed to allow the sliding key button 71 to be exposed to the housing 10 and can be disposed in a position to allow the user to easily operate while gripping the touch pen 1. In addition, the sliding key button 71 described above can be disposed in a location to allow the user to easily operate the sliding key button 71 by using an index finger thereof while gripping the touch pen 1. The sliding key button 71 can be operated forward and backward as shown in an arrow shown in FIG. 3.

Referring to FIGS. 4 to 5C, the touch pen 1 according to the present embodiment can include the hollow housing 10 having a certain length, the tip 50 installed to be moveable in an inner space 11 of the housing 10 to allow an end thereof to be exposed from the housing 10, a magnetic body joined together with the tip 50, a coil body 30 installed to be separated from the magnetic body 20 with a certain interval, a substrate 60 having a resonance circuit inducing a variance in inductance according to a variance of the interval between the magnetic body 20 and the coil body 30 caused by a flow (a movement) of the magnetic body 20, and an elastic body 40 maintaining the interval between the magnetic body 20 and the coil body 30. The elastic body 40 may be deformed while pressing the tip 50 to induce a variance in the interval between the magnetic body 20 and the coil body 30.

The tip 50 is formed to expose a part of one end thereof through an opening formed on an end of the housing 10, and the magnetic body 20 is mounted on another end thereof. In this case, a protrusion is formed on the other end of the tip 50 and a concave groove is formed on a bottom surface of the magnetic body 20 to be coupled with each other, thereby inducing the magnetic body 20 to be moveable together with the tip 50.

As the magnetic body 20, a ferrite chip can be used, for example. A guide protrusion is protruded from a top surface of the magnetic body 20 and has a configuration mounted on a guide groove formed on the elastic body 40. As the coil body 30, there is a coil wound a plurality of times around an outer circumferential surface of a ferrite core having a bar shape. Also, the coil body 30 can be closely fastened to the fastened substrate 60 not to flow in the inner space 11 of the housing 10.

Accordingly, the elastic body 40 is disposed between the magnetic body 20 and the coil body 30. The elastic body 40 is separated with a certain interval not to allow the magnetic body 20 and the coil body 30 to be in contact with each other, supports the magnetic body 20 pushed toward the coil body 30 by the tip 50, and when a force, that is, pen pressure applied to the tip 50 is removed, provides a restoring force to allow the magnetic body 20 to maintain an original interval from the coil body 30. As the elastic body 40, a material capable of maintaining an original shape while being used for a long time, such as rubber and silicon, for example, can be used.

After that, the sliding button unit 70 is installed in such a way that the part thereof is exposed to the outside of the housing 10. The sliding button unit 70 can include the sliding key button 71 installed to be partially exposed to the outside of the housing 10 and to slide forward and backward. A movable terminal 713 protrudes toward the coil body 30 in the housing 10. In addition, springs 12 and 13 are disposed on a front and a rear of the sliding key button 71 and provide elastic forces and restoring forces to allow the sliding key button 71 to be restored to a certain position.

The sliding key button 71 includes an operation part 711 partially exposed to the outside of the housing 10 to allow the user to operate and a guide rib 712 extended right and left from the operation part 711 to be disposed in the housing 10 not to allow the sliding key button 71 to be separated outward from the housing. The fluid terminal 713 is installed on a surface of the guide rib 712 to be protruded toward the coil body 30. The fluid terminal 713 is configured to be pressed from the inside of the sliding key button 71 to the outside thereof by a certain spring 714 to be pressed from the outside but to move in a direction of an arrow shown in FIG. 5C.

Accordingly, as shown in FIG. 4, when being installed in the housing 10 of the touch pen 1, the sliding key button 71 can move in a longitudinal direction of the touch pen 1 (the direction of the arrow shown in FIG. 4), and simultaneously, the movable terminal 713 is in contact with an outer circumferential surface of the coil body 30, thereby inducing selective contacts with wound parts P1, P2, P3, . . . , etc. of the coil 31.

Figure 6:
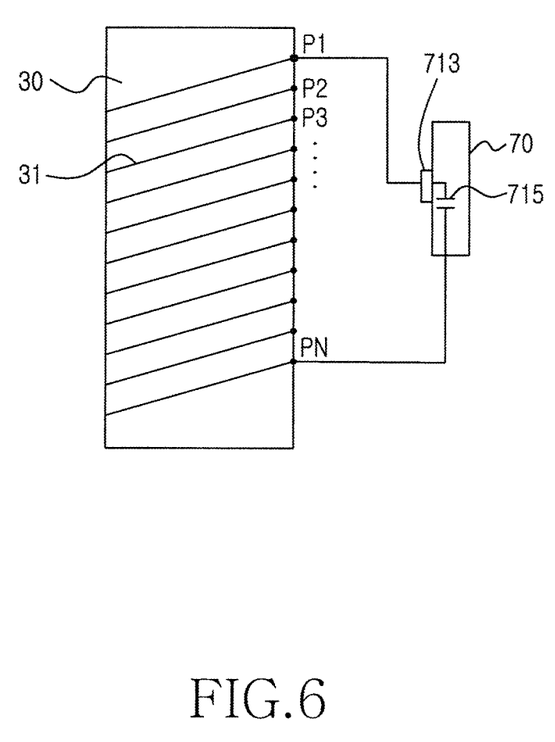
FIG. 6 is a configuration view illustrating a theory of operating a sliding button applied to the touch pen of FIG. 1.

FIG. 6 is a configuration view illustrating a theory of operating the sliding button (sliding key button) applied to the touch pen 1.

Referring to FIG. 6, the fluid terminal 713 is installed to be in contact with the wound parts P1, P2, P3, . . . , etc. of the coil 31 wound around the coil body 30 in such a way that a winding length of the coil 31 wound around the coil body 30 can be controlled according to a flow of the sliding key button 71. Also, the fluid terminal 713 can be electrically connected to an end PN of the coil 31 wound around the coil body by a conductive line including a certain capacitor 715. Accordingly, since parts of the fluid terminal 713 and the coil 31 wound around the coil body 30 in contact with each other are changed by the flow of the sliding key button 71, the winding length of the coil 31 connected by the end PN of the coil 31 and the fluid terminal 713 is changed. A frequency outputted from the touch pen 1 can vary with a variation of the winding length of the coil 31.

As shown in the drawings, the contact parts P1, P2, P3, . . . , etc. of the coil 31 wound around the coil body 30 can be changed by the fluid terminal 713 of the sliding key button 71 and the conductive line connected to the end of the coil 30 is not changed. Accordingly, when the sliding key button 71 moves downwardly, a whole length of the coil 31 for generating a frequency can be changed from being connected to the contact part P1, the fluid terminal 713, and the end PN into being connected to the contact part P2, the fluid terminal 713, and the end PN.

Figure 7A:
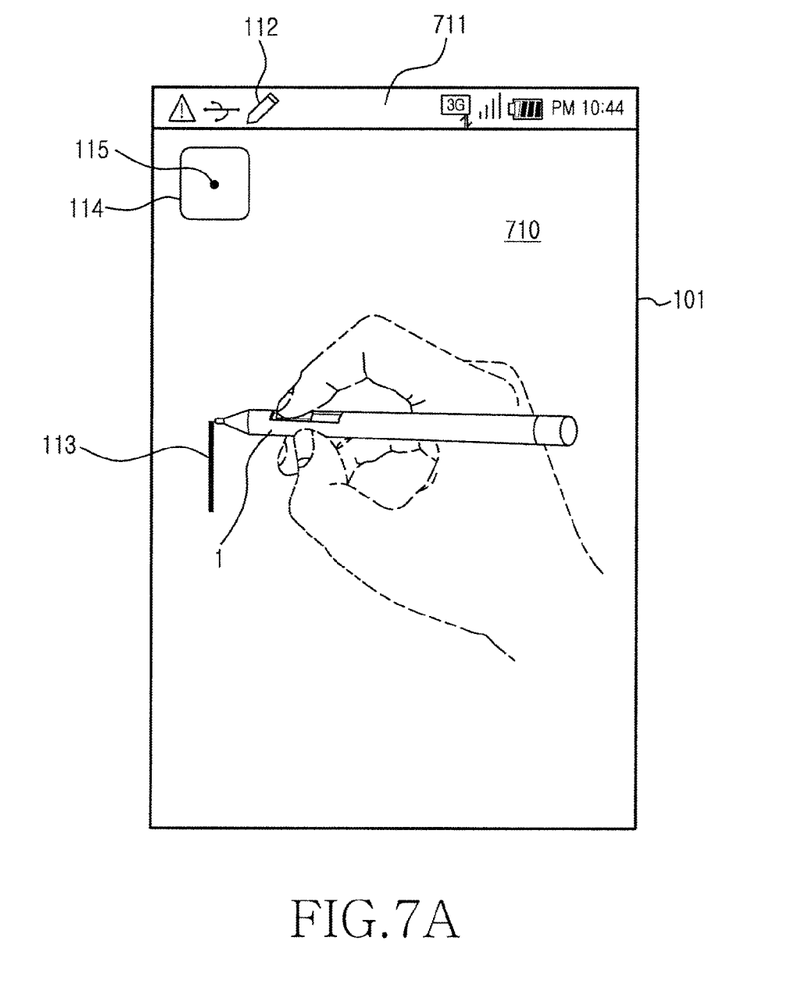
FIGS. 7A and 7B are views illustrating a state of displaying data inputted by the touch pen of FIG. 1 on the electronic device.
Figure 7B:
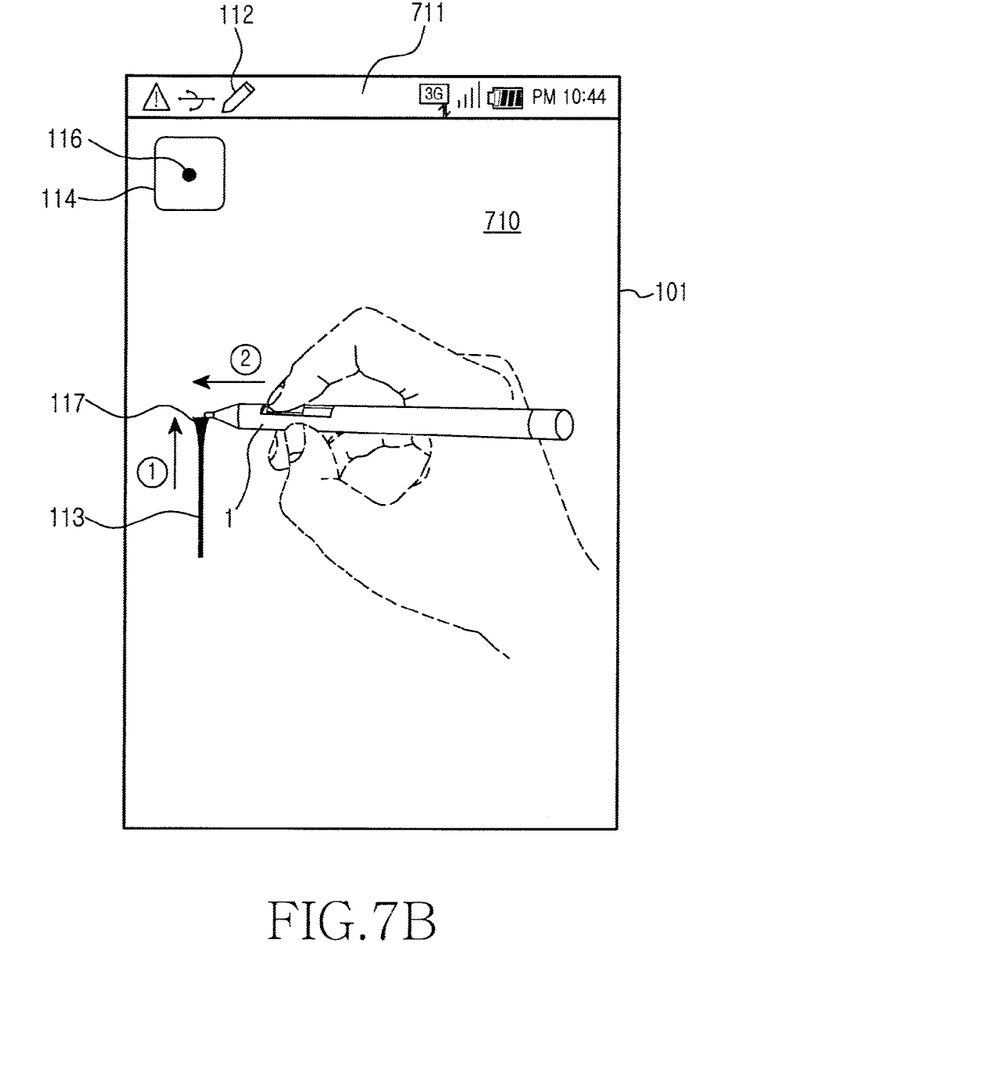

FIGS. 7A and 7B are views illustrating a state of displaying data inputted by the touch pen 1 on the electronic device 100.

As shown in FIG. 7A, a touch pen input mode is being performed on a display screen 710 of the touch screen unit 101 of the electronic device 100. In this case, a notice bar 711 for notifying a present mode to the user can be displayed on a top of the display screen 110 and an icon 112 for the touch pen input mode can be displayed on the notice bar 111 to allow the user to know whether a present data input mode is a mode for inputting data by using the touch pen 1 or not.

In the touch pen input mode, when the user allows the touch pen 1 to be in contact with or to be close to the display screen 710 and then transfer the touch pen 1, a line having a corresponding thickness is displayed as a transfer rate of the touch pen 1. In this case, a preview window 114 can be generated in a certain area of the display screen 710 to show the thickness of the line to the user, and a present line thickness image 115 can be displayed on the preview window 114. As shown in the drawings, the line thickness image 115 is shown as a circular shape having the thickness of the corresponding line but is not limited thereto and various images capable of notifying a thickness of a line currently inputted to the user can be applied.

On the other hand, as shown in FIG. 7B, when the user is operating a sliding button in a direction ② while drawing a line in a direction ① by using the touch pen 1, the line is displayed to be relatively thicker and the line thickness image 115 of a thickness corresponding thereto can be displayed. This operation is based on that the user allows the sliding key button 71 of the sliding button unit 70 to flow, thereby changing a contact position of the coil 31 wound around the coil body 30 by the fluid terminal 713.

Particularly, the operation according to the present embodiment is useful while the user is operating the tip 50 of the touch pen in a sensible adjacent section without a contact with the display screen 110, which is designated as "a hovering section", different from generally controlling a thickness of a line by pressing a tip.

Figure 8:
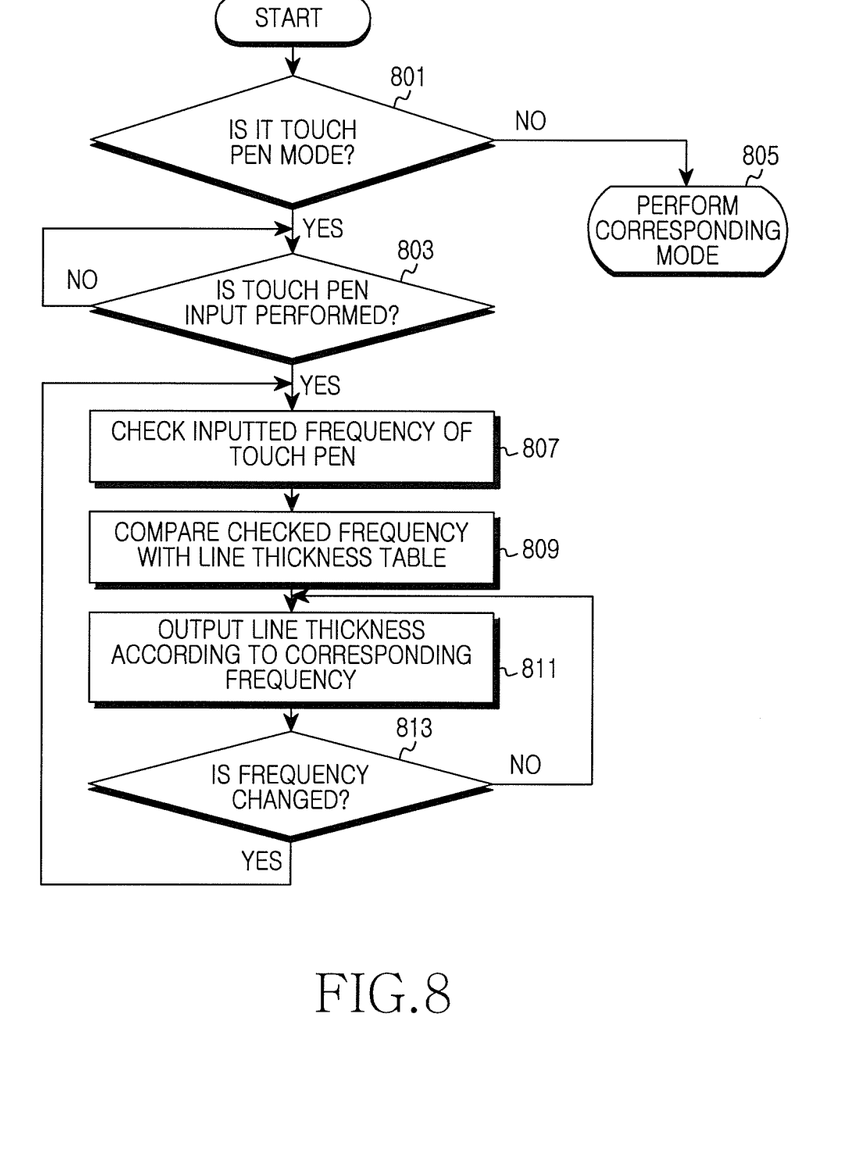
FIG. 8 illustrates a method of outputting data in the electronic device according to an input of the touch pen of FIG. 1.

FIG. 8 illustrates a method of outputting data in an electronic device according to an input of a touch pen according to certain embodiments of the present disclosure. Referring to FIG. 8, the electronic device checks whether it is a touch pen mode or not in block 801. When it is not the touch pen mode, in block 805, a corresponding mode is performed.

When the electronic device checks that it is the touch pen mode, in block 803, it is checked whether a touch pen input is performed. When the input of the touch pen is checked, the electronic device, in block 807, checks an inputted frequency of the touch pen, and in block 809, compares the inputted frequency with a mapping table stored in a data storage unit of the electronic device. In the mapping table, various line thicknesses are stored in association with a corresponding frequency or range of variable frequencies. Corresponding line thicknesses associated with a range of a variable frequencies may thereby be mapped to operations of the sliding key button.

Accordingly, the electronic device compares a line thickness according to a presently inputted frequency with the line thickness mapping table, and in block 811, outputs the line thickness according to the corresponding frequency. After that, in block 813, it is checked whether the frequency inputted by the touch pen is changed or not. When the frequency is changed, a process of performing the operation of block 807 again can be repeated.

Figure 9:
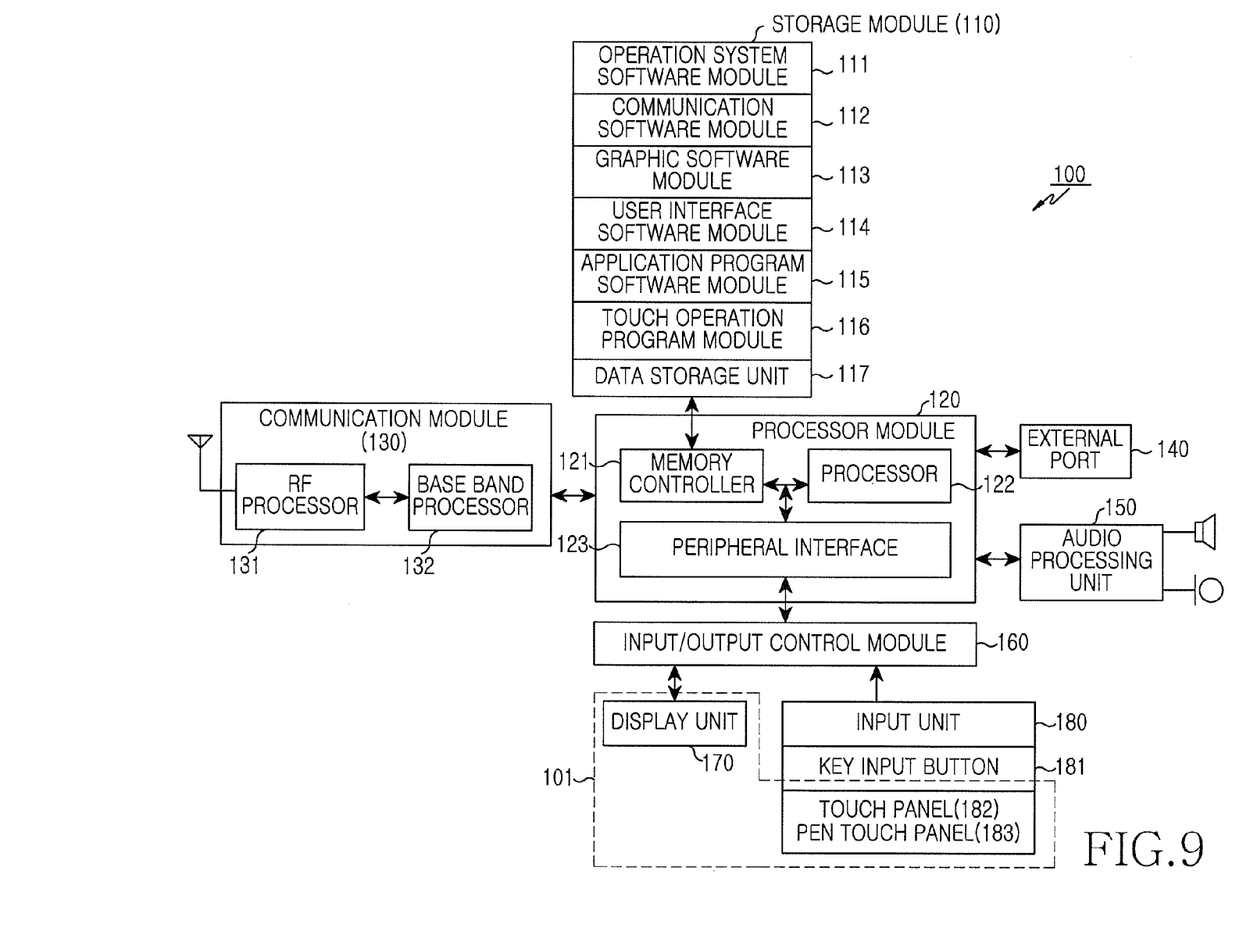
FIG. 9 is a block view illustrating the electronic device to which the touch pen of FIG. 1 is applied.

FIG. 9 is a block view illustrating the electronic device 100 to which the touch pen 1 is applied. Referring to FIG. 9, the electronic device 100 includes a storage module 110, a processor module 120, a communication module 130, an external port 140, an audio processing unit 150, an input/output control module 160, a display unit 170, and an input unit 180. In this case, the storage module 110 and the external port 140 can be present as pluralities thereof and the display unit 170 is a display module and can include a high pixel thin film transistor (TFT) LCD module.

The processor module 120 includes a memory controller 121, a processor 122, and a peripheral interface 123. In this case, the processor 121 can be present as a plurality thereof.

The communication module 130 includes a radio frequency (RF) processor 131 and a base band processor 132. The elements described above can be provided as hardware such as at least one integrated circuit, software, or a combination of the hardware and the software.

The storage module 110 can include a program storage part for storing programs for controlling the operations of the electronic device 100 and a data storage unit 117 for storing data generated while performing the programs. For example, the program storage part includes an operation system software module 111, a communication software module 112, a graphic software module 113, a user interface software module 114, at least one application program software module 115, and a touch operation program module 116 according to the present embodiment.

The operation system software module 111 includes at least one software component for controlling general system operations. In this case, the operation system software module 111 also allows communications between a plurality of hardware units and a plurality of software components to be smoothly performed.

The communication software module 112 includes at least one software component for processing data transmitted and received via one of the RF processor 131 and the external port 140. The graphic software module 113 includes at least one software component for providing and displaying graphics on the display unit 170. The user interface module 114 includes at least one software component related to a user interface. The application program software module 115 includes at least one software component with respect to application programs installed in the portable electronic device 100.

The touch operation program module 116 can include not only a software component for correcting touch errors recognized by a touch panel integrated circuit and a pen touch panel integrated circuit included in the input/output control module 160 but also various routines for supporting the multiple touch panel operation. For example, the touch operation program module 116 can include a routine supporting the touch panel 182 and the pen touch panel 183 to be activated and a routine sensing a frequency varying with operating the sliding button unit 70 of the touch pen 1 while activating the pen touch panel 183 and collecting a corresponding pen touch event.

Additionally, the touch operation program module 116 includes a routine for classifying the kinds of inputted touch events by checking information corresponding to device information of a touch panel and device information of a digitizer-based touch pen corresponding to a pen touch panel.

The memory controller 121 of the processor module 120 controls access to the storage module 110 of other elements such as the processor 122 and the peripheral interface 123 and controls various signal flows and collection and output of information necessary for supporting the multiple touch panel operation.

The processor module 120 can control, when it is sensed that a touch pen is in close proximity to the pen touch panel 183, in such a way that a function of the touch panel 182 sensing a touch of a human body is released and only an input of the touch pen is sensed. Also, the processor module 120 can detect a variable frequency inputted from the touch pen 1 and can output a continuous and detailed line thickness corresponding to the frequency. Also, the processor module 120 can control in such a way that the frequency inputted by the touch pen 1 and a table including corresponding line thicknesses for respective frequencies stored in the data storage unit 117 are checked and a corresponding line thickness is outputted.

The peripheral interface 123 controls connections among input/output peripheral devices, the processor 122, and the storage module 110 of the electronic device 100.

The processor 122 controls a portable terminal to provide various services such as voice communication and data communication by using at least one software program. Also, the processor 122 controls a software module stored in the storage module 110 to be executed to provide multimedia service.

The memory controller 121, the processor 122, and the peripheral interface 123 included in the processor module 120 can be provided as a single chip or individual chips.

The RF processor 131 processes a high frequency signal transmitted and received via an antenna. For example, the RF processor 131 converts a base band signal provided from the base band processor 132 into a high frequency signal and transmits the high frequency signal via the antenna. Also, the RF processor 131 converts a high frequency signal provided via the antenna into a base band signal and transmits the base band signal to the base band processor 132. In this case, the RF processor 131 includes an RF transceiver, an amplifier, a tuner, an oscillator, a digital signal processor, a coding decoding (CODEC) chip set, a subscriber identity module (SIM) card.

The external port 140 includes a connection interface allowing a portable terminal to be directly connected to other devices or to be connected to other devices via a network. For example, the external port 140 includes a charge interface for charging an electronic device.

The audio processing unit 150 forms an audio packet between the user and the portable electronic device 100 by using a speaker and a microphone and provides an audio interface.

The input/output control module 160 provides an interface among input/output devices such as the display unit 170 including a display module and the input unit 180 including a key input button 181, a touch panel, and a pen touch panel and the peripheral interface 123. In this case, the input/output control module 160 can include driver integrated circuits determining touch coordinates according to input information inputted from the touch panel and the pen touch panel, respectively.

The display unit 170 displays state information of the portable electronic device 100, a text inputted by the user, a moving picture, and a still picture according to control of the graphic software module 113. Also, the display unit 170 displays touch information inputted to the touch panel and the pen touch panel of the input unit 180. Particularly, the processor module can output a line thickness corresponding to an input frequency of the touch pen, currently inputted.

Since the touch pens and the electronic devices according to various embodiments of the present disclosure are easily operated by using the slide button while operating the touch pen, data inputted by using the touch pen can be continuously outputted in detail, thereby providing increased convenience of operation to the user and increasing reliability of the device.

There are various methods of modifying the embodiments within a range of the scope of the claims of the present disclosure. In other words, without being out of the scope of the following claims, there will be many other methods of executing the present disclosure.

For example, in the present embodiment, two springs are applied perpendicularly to the sliding key button 71 to allow the sliding key button 71 to return to an original position. However, although the sliding key button 71 does not return without the springs, a corresponding line thickness can be displayed. Additionally, when an input event of the touch pen does not occur for a certain time in the touch pen input mode, the line thickness can restore a default value or a predetermined line thickness value.

While the disclosure has been shown and described with reference to certain embodiments thereof, it will be understood by those skilled in the art that various changes in form and details may be made therein without departing from the spirit and scope of the disclosure as defined by the appended claims. Therefore, the scope of the disclosure is defined not by the detailed description but by the appended claims, and all differences within the scope will be construed as being included in the present disclosure.

What is claimed is:

1. An electronic device including a touch pen, wherein the touch pen comprises:
   a hollow housing;
   a coil body disposed in an interior of the hollow housing and comprising a plurality of coil windings;
   a magnetic body separated from the coil body; and
   a button unit moveably connected to the coil windings and configured to adjust an electrical length of the coil windings, wherein the button unit comprises:
      a sliding key button partially exposed to an exterior of the hollow housing and configured to slide in a longitudinal direction of the hollow housing; and
      a movable terminal installed protruding from the sliding key button toward the coil body configured to be in contact with the coil windings.

2. The electronic device of claim 1, wherein one end of the movable terminal changes the electrical length of the coil windings by changing a contact part with the coil windings according to a sliding operation of the sliding key button.

3. The electronic device of claim 2, wherein another end of the movable terminal is constantly, electrically connected to an end of the coil regardless of a movement of the sliding key button.

4. The electronic device of claim 3, wherein a capacitor is further disposed between the contact part and the end of the coil.

5. The electronic device of claim 1, wherein the sliding key button comprises:
   an operation part exposed to the exterior of the hollow housing;
   a guide rib extended from the operation part and configured to be disposed in the hollow housing and preventing a separation of the sliding key button;
   a metallic movable terminal installed to be partially exposed from the inside of the operation part and controlled not to be separated from the operation part; and
   a spring constantly pressing the movable terminal outward in the operation part.

6. The electronic device of claim 1, further comprising at least one spring installed in the hollow housing configured to allow the sliding key button to restore an original position after operation.

7. A touch pen comprising:
   a hollow housing;
   a coil body disposed in an interior of the hollow housing and comprising a plurality of coil windings;
   a magnetic body separated from the coil body; and
   a button unit moveably connected to the coil windings configured to adjust an electrical length of the coil windings, wherein the button unit comprises:
      a sliding key button partially exposed to an exterior of the hollow housing and configured to slide in a longitudinal direction of the hollow housing; and
      a moveable terminal installed protruding from the sliding key button toward the coil body configured to be in contact with the coil windings.

8. The touch pen of claim 7, wherein one end of the moveable terminal changes the electrical length of the coil windings by changing a contact part with the coil windings according to a sliding operation of the sliding key button.

9. A method of operating an electronic device comprising a touch pen, the method comprising:
   identifying, when an input is performed by the touch pen, a frequency emitted from the touch pen, wherein the touch pen includes a moveable button unit partially exposed to an exterior of the touch pen and the touch pen is configured to change the frequency emitted from the touch pen by adjusting an electric length of coil windings around a coil body in the touch pen according to the movement of the button unit;
   comparing the identified frequency with an output data table; and
   outputting data corresponding to the frequency.

10. The method of claim 9, further comprising, after the comparing with the output data table, displaying a preview window corresponding to the data.

11. The method of claim 10, wherein the outputted data is a line having a certain thickness outputted by a transfer of the touch pen.

12. The method of claim 11, wherein data outputted in the preview window is displayed in a line thickness corresponding to a frequency currently inputted or a frequency just before being inputted.

13. The method of claim 9, wherein, the input performed by the touch pen comprises an input event sensed when the touch pen enters within a certain sensing distance before contact between the touch pen and a display surface of the electronic device.

14. The method of claim 9, comprising, after the outputting the data:
   determining whether the frequency emitted by the touch pen has changed; and
   outputting, when the frequency pen has changed, data changed corresponding to the changed frequency.

15. The method of claim 9, wherein, after the outputting the data, when an input of the touch pen is not recognized for a certain amount of time, the outputted data is changed into a default value.

16. An electronic device comprising:
   an electromagnetic inductive touch pen comprising a moveable button unit partially exposed to an exterior of the touch pen;
   a pen touch panel configured to detect a frequency emitted from the touch pen; and
   at least one processor configured to sense a variance in the frequency of the touch pen and to output corresponding data according to a changed frequency and according to a movement of the button unit,
   wherein the touch pen is configured to change the frequency emitted from the touch pen by adjusting an electric length of coil windings around a coil body in the touch pen according to the movement of the button unit.

17. The electronic device of claim 16, wherein the processor is configured to output the corresponding data to a preview screen of a display unit before or simultaneously with outputting the corresponding data according to the changed frequency.

* * * * *